United States Patent [19]

Matsuda et al.

[11] Patent Number: 4,880,595

[45] Date of Patent: Nov. 14, 1989

[54] PROCESS AND APPARATUS FOR CLEANING NUCLEAR REACTOR COOLING WATER

[75] Inventors: Masami Matsuda, Hitachi; Kiyomi Funabashi, Katsuta; Takashi Nishi, Hitachi; Itaru Komori, Katsuta; Tsutomu Baba, Katsuta; Hideo Yusa, Katsuta; Shunsuke Uchida, Hitachi; Tetsuro Adachi, Katsuta; Katsumi Ohsumi, Hitachi; Tomohiro Sato, Ibaraki, all of Japan

[73] Assignee: Hitachi, Ltd., Tokyo, Japan

[21] Appl. No.: 303,055

[22] Filed: Jan. 27, 1989

Related U.S. Application Data

[63] Continuation of Ser. No. 883,524, Jul. 8, 1986, abandoned.

[30] Foreign Application Priority Data

Jul. 10, 1985 [JP] Japan .................................... 150251

[51] Int. Cl.[4] ........................ G21C 19/42; C02F 1/42; C21F 9/08

[52] U.S. Cl. .................................... 376/313; 376/310; 210/682; 521/38; 252/631

[58] Field of Search ................ 376/313, 310; 252/631; 210/682; 521/38

[56] References Cited

U.S. PATENT DOCUMENTS

| | | |
|---|---|---|
| 3,216,786 | 9/1965 | Corte et al. . |
| 4,087,583 | 5/1978 | Moore ............................ 210/682 X |
| 4,123,324 | 10/1978 | Sanada et al. ...................... 376/313 |
| 4,477,596 | 10/1984 | Fujimoto .......................... 521/38 X |
| 4,657,731 | 4/1987 | Otte et al. .......................... 376/313 |

FOREIGN PATENT DOCUMENTS

| | | |
|---|---|---|
| 2068158 | 12/1969 | France . |
| 2221406 | 2/1974 | France . |
| 57-53154 | 11/1982 | Japan . |
| 58-76146 | 5/1983 | Japan . |
| 63498 | 4/1985 | Japan .................................. 376/313 |
| 972943 | 10/1962 | United Kingdom . |
| 2144111 | 7/1984 | United Kingdom . |

*Primary Examiner*—John S. Maples

*Attorney, Agent, or Firm*—Antonelli, Terry & Wands

[57] ABSTRACT

A process and an apparatus for cleaning nuclear reactor cooling water with cation exchange resin whose ion-exchanging groups have a bonding energy of not more than 300 KJ/mole are disclosed, whereby the radiation exposure of operators in an atomic power plant can be considerably reduced, and the waste ion exchange resin can be readily disposed.

4 Claims, 11 Drawing Sheets

* t 1/10 : DIPPING TIME UNTIL THE ION EXCHANGE CAPACITY BECOMES 1/10

(a) BEFORE FILTRATION (b) AFTER FILTRATION

PROCESS AND APPARATUS FOR CLEANING NUCLEAR REACTOR COOLING WATER

This application is a continuation of application Ser. No. 883,524, filed July 8, 1986, now abandoned.

BACKGROUND OF THE INVENTION

This invention relates to a process and an apparatus for cleaning nuclear reactor cooling water in atomic power plants, and particularly to a process and an apparatus for cleaning nuclear reactor cooling water in a filtration-desalting system using powdery ion exchange resin capable of reducing the radiation exposure of operators working in an atomic power plant and of being readily susceptible to waste disposal.

With recent increase in the number of atomic power plants in operation, reduction in radiation exposure of operators during the normal operating period and the periodic inspection period has been keenly desired, and thus it is necessary to efficiently remove radioactive materials contained in the nuclear reactor cooling water, such as fine particles having particle sizes of about 0.1–10 μm, composed mainly of iron oxides called "cruds", or radioactive metal ions such as $^{60}Co^{2+}$, $^{59}Fe^{2+}$, etc.

In a boiling water-type nuclear reactor, the cooling water recovered by a condenser after the driving of a turbine has been so far cleaned by a filteration desalter precoated with powdery ion exchange resin and an ordinary desalter using a mixed bed of granular cation exchange resin and anion exchange resin, and fed to the nuclear reactor. The powdery ion exchange resin used in the filtration desalter has been a powdery mixture of pulverized cation exchange resin and anion exchange resin. Usually, the filtration desalter and the desalter together are generally referred to as "apparatus for cleaning nuclear reactor cooling water".

Reasons why the apparatus for cleaning nuclear reactor cooling water has a remarkable effect upon reduction in the radiation exposure will be described in detail below.

The main cause for radiation exposure is deposition of radioactive cruds and radioactive $^{60}Co^{2+}$ on the piping, and the piping dosage is increased thereby. Furthermore, a cause for forming radioactive cruds and $^{60}Co^{2+}$ is radioactivation of non-radioactive iron or cobalt dissolved from the condenser or piping into cooling water through neutron irradiation in the nuclear reactor. Thus, the reduction in the radiation exposure can be made by removing iron and cobalt in both crud and ion states in cooling water, irrespective of the radioactive or non-radioactive nature. Thus, apparatuses for cleaning nuclear reactor cooling water, based on a combination of a filtration desalter and a desalter, have been used, where the filtration desalter provided on the upstream side removes cruds and metal ions as radioactive materials in the cooling water at the same time, whereas the desalter removes the remaining metal ions which have not been completely removed in the filtration desalter.

In the foregoing prior art, the filtration desalter and the desalter use benzenesulfonic acid-based cation exchange resin and quaternary ammonium-based anion exchange resin as the powdery or granular ion exchange resins. Their molecular structures are shown below:

(a) Cation exchange resin (benzenesulfonic acid-based resin)

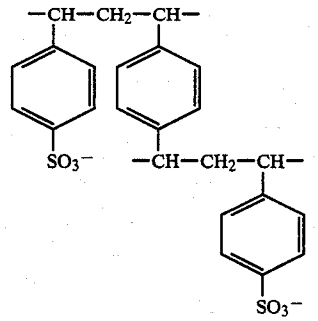

(b) Anion exchange resin (quaternary ammonium-based resin)

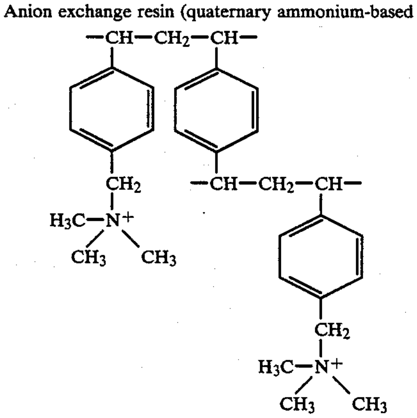

The reasons why the benzenesulfonic acid-based resin is selected as a cation exchange resin and the quaternary ammonium-based resin as an anion exchange resin among so many kinds of ion exchange resin are that they have a good heat resistance and a good radiation resistance, and moreover the benzenesulfonic acid-based resin is strongly acidic and the quaternary ammonium-based resin is strongly basic, so that they have a distinguished ability to remove neutral salts such as NaCl, etc., if present in the cooling water due to a leakage of sea water from the condenser.

As described above, use of an apparatus for cleaning cooling water, which comprises a filtration desalter and a desalter, can considerably reduce the radiation exposure of operators working in an atomic power plant. However, still much more reduction in the radiation exposure has been nowadays desired.

There has been proposed a process for using weakly acidic ion exchange resin, for example, weakly acidic cation exchange resin having carboxyl groups as ion-exchanging groups in an apparatus for cleaning nuclear reactor cooling water [Japanese Patent Application Kokai (Laid-open) No. 58-76146]. However, as a result of extensive studies made by the present inventors, it has been found that a portion of the weakly acidic cation exchange resins combined with non-radioactive metal ions leaks into the cooling water and deposits onto fuel rods, as in the case of benzenesulfonic acid-type cation exchange resin, and the non-radioactive metal ions are radioactivated, and redissolved into the cooling water to make deposition onto pipings and increase the radiation dosage as will be described in detail later.

To clasify the causes for the phenomena, the present inventors have made further studies and have found that, among the weakly acidic cation exchange resins, those whose ion-exchanging groups are directly bonded to the benzene rings have a relatively high bonding energy and show the similar phenomena to those of the sulfonic acid type resins. As a result of further studies, it has been found that only weakly acidic cation exchange resins whose ion-exchanging resins have a bonding energy of not more than 300 KJ/mole are effective for cleaning the nuclear reactor cooling water. The present invention is based on the said findings.

SUMMARY OF THE INVENTION

An object of the present invention is to provide a process and an apparatus for cleaning nuclear reactor cooling water with an ion exchange resin capable of reducing a radiation exposure of operators working in an atomic power plant and of being readily susceptible to waste disposal.

According to the present invention, there is provided a process for purifying nuclear reactor cooling water which comprises contacting nuclear reactor cooling water with a cation exchange resin whose ion-exchanging groups bonded to the main chain of an aromatic ring-containing polymer have a bonding energy of not more than 300 KJ/mole, thereby trapping cruds or cations in the cooling water.

The present inventors have found that the radiation exposure of operators can be much more reduced by improving the apparatus for cleaning nuclear reactor cooling water now in use. That is, powdery ion exchange resin is used in a filtration desalter, where the powdery ion exchange resin has an average particle size of about 30 μm, but its particle size distribution is so broad that the involved smallest particle size is less than 5 μm. When such powdery ion exchange resin (a mixture of cation exchange resin and anion exchange resin) is used in the filtration desalter, a portion of the resin powder having particle sizes of less than 5 μm leaks out of the filtration desalter and enters into the cooling water. The leaked powdery ion exchange is brought, as such, into the nuclear reactor to increase the radiation exposure of operators. The foregoing has been found by the present inventors. This will be described in detail below, referring to the accompanying drawings.

DETAILED DESCRIPTION OF THE INVENTION

Figure 3:
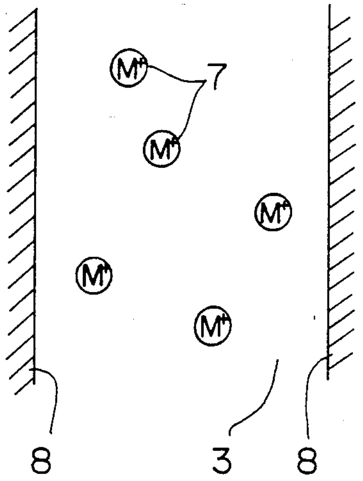
FIGS. 3 and 4 are schematic views showing the behavior of metal ions in a nuclear reactor.

FIG. 3 shows a case where cooling water 3 containing no leaked ion exchange resin, but only non-radioactive metal ions dissolved from pipings, etc. such as cobalt ions, etc. flows into a nuclear reactor. In the nuclear reactor, fuel rods 8 whose surfaces are covered by an oxide film are provided. When an electrically charged state of metal ions 7 flowing into the nuclear reactor and the surfaces of fuel rods 8 are taken into account, the metal ions are, needless to say, positively charged, and the surfaces of fuel rods 8 also have a positive surface potential, because the zeta potential of the oxide film is positive in water at pH 5 to 8. In such a state, the metal ions 7 and the surfaces of fuel rods 8 are positively charged, and thus the metal ions 7 are substantially not deposited on the surfaces of fuel rods 8, as shown in FIG. 3.

Figure 4:
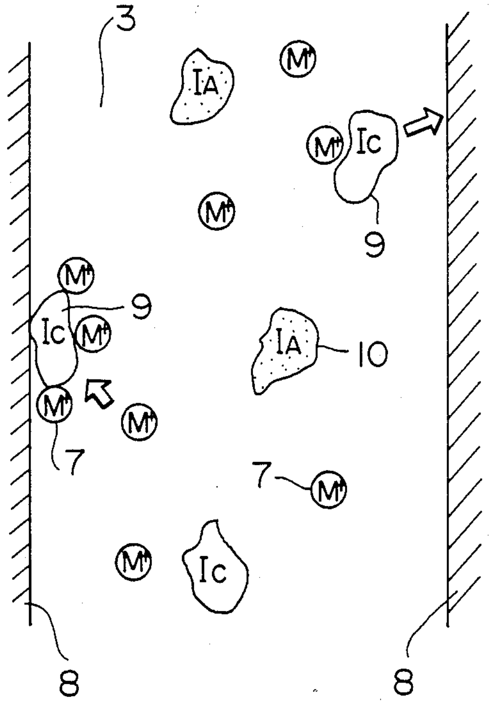

FIG. 4 shows a case where the ion exchange resins (cation exchange resins 9 and anion exchange resins 10) leaked from the filtration desalter enter into the cooling water. The cation exchange resins 9 are negatively charged, whereas the anion exchange resins 10 are positively charged. Since the surfaces of fuel rods 8 are positively charged, a portion of the negatively charged cation exchange resins 9 deposits onto the surfaces of fuel rods 8. Non-radioactive metal ions such as cobalt ions, etc. are ionically adsorbed on the deposited cation exchange resins 9. Usually, the cation exchange resins 9 are not saturated with the adsorbed metal ions, and thus will also ionically adsorb metal ions 7 suspended in the cooling water 3. Thus, it has been found that, once cation exchange resins leak into the cooling water, the amount of non-radioactive metal ions deposited on the surfaces of fuel rods 8 will be increased. That is, it has been found that, when cation exchange resins leak into the cooling water, the average residence time of the non-radioactive metal ions in the nuclear reactor will be prolonged.

Cobalt 59 ($^{59}Co$) is typical of non-radioactive metal ions contained in the cooling water 3, but the $^{59}Co$ will be partially converted to cobalt 60 ($^{60}Co$) when subjected to neutron irradiation in the nuclear reactor. It has been found that, when the cation exchange resins 9 leak into the cooling water 3, $^{59}Co$, etc. will stay in the nuclear reactor for a prolonged residence time, and consequently the yield of radioactive metals such as $^{60}Co$, etc. will be increased. That is, the radiation exposure of operators will be increased.

The yield of radioactive metals in the nuclear reactor will be increased by leakage of cation exchange resins from the filtration desalter, and a portion of radioactivated metals peels from the fuel rods 8 and again dissolves into the cooling water. As a result, the radioactive density of cooling water will be increased. Since a portion of the radioactive metal ions in the cooling water deposits on the piping, the dosage of piping will be increased. For the same reasons as explained, referring to FIGS. 3 and 4, the amount of radioactive metal ions deposited on the piping will be increased by the presence of cation exchange resins.

When the cation exchange resins leak into the cooling water, the yield of radioactive metals will be increased and the amount of radioactive metals deposited on the piping will be increased in this manner, resulting in increasing radiation exposure of operators.

The anion exchange resins 10 are positively charged and thus hardly deposit on the surfaces of fuel rod or piping, because these surfaces are positively charged.

Figure 5:
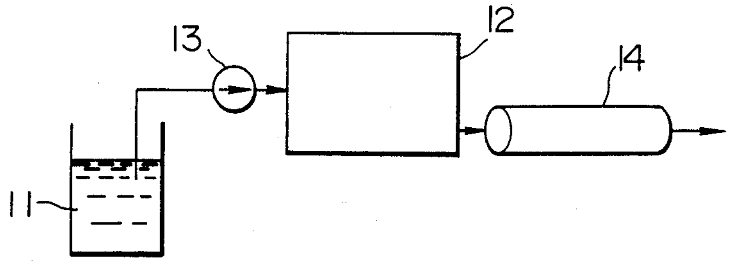
FIG. 5 is a flow diagram of a test apparatus explaining the present invention.

The present inventors have obtained the foregoing finding through the following test, using a test apparatus shown in FIG. 5. A circumstance corresponding to the core water conditions for a boiling water-type nuclear reactor was made by heating pure water 11 containing about 1 ppb of $^{60}Co$ to 280° C. under 70 atmospheres by a heater 12, and passing the heated water through a piping 14 by a pump 13. The amount of $^{60}Co$ deposited on the piping 14 was determined after the passage through the piping 14. When the pure water contained about 0.01 ppm of cation exchange resins, it was found that the amount of $^{60}Co$ deposited on the piping was 1.5–2-fold increased, as compared with that when the pure water contained no cation exchange resins. Furthermore, when the pure water contained the anion exchange resins, no increase was found in the amount of $^{60}Co$ deposited on the piping 14.

It is seen from the foregoing results that it is effective to prevent leakage of cation exchange resins into the cooling water to reduce the radiation exposure of operators.

The ion exchange resins are used in both filtration desalter and desalter, which constitute an apparatus for cleaning nuclear reactor cooling water, and a mixture of cation exchange resins and anion exchange resins is used in these two units. In the desalter, granular ion exchange resins having particle sizes as large as about 500 μm are used, and leakage of the ion exchange resin into the cooling water hardly occurs, whereas in the filtration desalter the average particle size of ion exchange resin is as small as about 30 μm with a broad particle size distribution of from a few μm to about 100 μm, and thus ion exchange resins having smaller particle sizes are liable to leak into the cooling water. Thus, it is necessary to provide a means for preventing the cation exchange resin leakage from the filtration desalter. Such a means would be use of only powdery ion exchange resins having particle sizes above a predetermined size, for example, above 5 μm, and is indeed effective for the leakage prevention, but disadvantageous from the viewpoint of cost, because the powdery ion exchange resins are prepared by pulverizing granular ion exchange resins, and thus inevitably contain those having particle sizes as small as 1 μm, and when only those having particle sizes above the predetermined size are to be used, it is necessary to single them out from the thus prepared powdery ion exchange resins by screening. Furthermore, such singling-out becomes much complicated and costly, because the particle size to be singled out is as small as a few μm.

The present inventors have studied the presence of cation exchange resins incapable of increasing the radiation exposure of operators even if the cation exchange resins leak into the cooling water and have found that it is effective to use cation exchange resins whose ion exchanging groups are bonded to other elements than the carbon atoms constituting a benzene ring.

When the cation exchange resins leak into the cooling water 3, they will deposit on the surfaces of fuel rods and the average residence time of the non-radioactive metal ions such as $^{59}Co$, etc, in the nuclear reactor will be prolonged thereby, and the yield of radioactive metals will be increased, as already described above. Heretofore, benzenesulfonic acid-based resins whose ion exchanging groups ($SO_3^-$) are directly bonded to the benzene ring have been used as cation exchange resins and it has been found that such resins have a high heat resistance and a high radiation resistance, and are hardly decomposed even used in the primary system of a nuclear reactor.

The reasons why the cation exchange resins are liable to deposit on the fuel rods 8 are that the cation exchange resins 9 are negatively charged, and the reasons why the cation exchange resins are negatively charged are as follows: the polymer body (copolymer of styrene and divinylbenzene) is electrically neutral, but the ion-exchanging groups are negatively charged as their property, and thus the cation exchange resins are negatively charged on the whole.

When the cation exchange resins enter into a nuclear reactor, they are exposed to a higher temperature and an intense radiation, and thus are more susceptible to decomposition. Decomposition of cation exchange resin starts at first at the positions of the ion-exchanging groups having the lowest chemical bonding energy, as given by the following chemical equation:

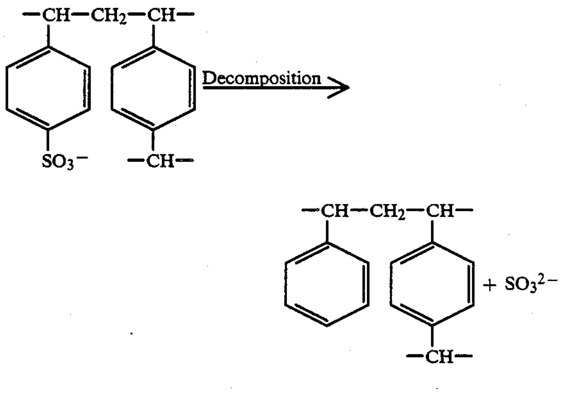

If it is presumed that a cation exchange resin is decomposed as shown by the foregoing equation, an electrically neutral polymer body and a negatively charged sulfite ion ($SO_3^{2-}$) are formed. The sulfite ion migrates into the cooling water 3 owing to its solubility, whereas the remaining polymer body becomes electrically neutral, and thus hardly deposits onto the surfaces of fuel rods 8. Even if the polymer body deposits thereon, it has no more ion-exchanging capacity, and thus the non-radioactive metal ions in the cooling water are not retained on the surfaces of fuel rod for a prolonged period. Furthermore, the cation exchange resin whose ion-exchanging groups have been decomposed is electrically neutral, and thus hardly deposits even on the piping. Consequently, deposition of radioactive metals such as $^{60}Co$, etc. is no more promoted thereby.

In the foregoing, the case of liberating the ion-exchanging groups from the cation exchange resin by decomposition has been described. Heretofore, benzenesulfonic acid-based resins having a high heat resistance and a high radiation resistance have been used as cation exchange resins. That is, the ion-exchanging groups have been hard to liberate from such cation exchange resins by decomposition, and the said effect of reducing radiation exposure of operators has not been obtained. In other words, the effect of reducing the radiation exposure of operators can be obtained by using cation exchange resins readily susceptible to thermal decomposition.

Cation exchange resins readily susceptible to thermal decomposition will be described below.

Cation exchange resins can be classified into the following two large groups on the basis of species of elements to which the ion-exchanging groups are bonded: one is the group where the ion-exchanging groups are bonded to the carbon atoms constituting a benzene ring, as will be hereinafter referred to as "benzene ring type", and another is the group where the ion-exchanging groups are bonded to other elements than the carbon atoms constituting a benzene ring, as will be hereinafter referred to as "straight chain type".

Table 1 shows examples of benzene ring type and straight chain type cation exchange resins.

TABLE 1

| Group | | Molecular structure | Bonding energy (KJ/mol.) |
|---|---|---|---|
| Benzene ring type | Ⓐ | 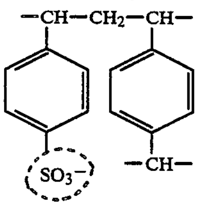 | 339 |
| | Ⓑ | 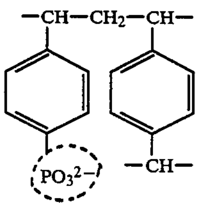 | — |
| | Ⓒ | 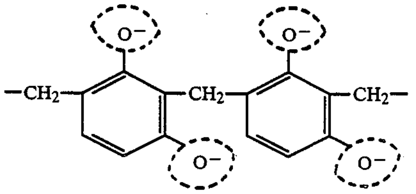 | 447 |
| | Ⓓ | 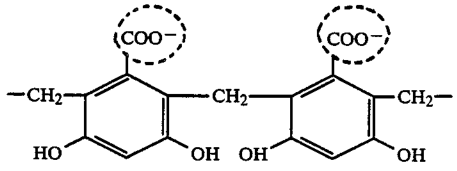 | — |
| Straight chain type | Ⓔ | 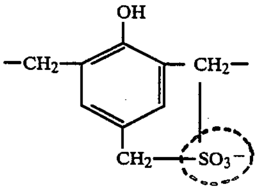 | 289 |
| | Ⓕ | 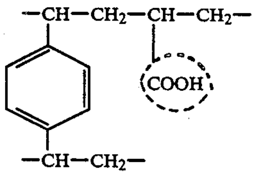 | 260 |

TABLE 1-continued

| Group | Molecular structure | Bonding energy (KJ/mol.) |
| --- | --- | --- |
| (G) | 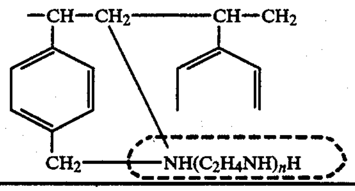 | 293 |

Remark:

(dashed outline) shows ion-exchanging group.

Seven kinds of cation exchange resins given in Table 1 were subjected to a test to find out thermally weak resins. The test was carried out in the following manner. Seven kinds of the cation exchange resins were dipped in hot water at 280° C. under 70 atmospheres to show changes in ion exchange capacity to investigate how the ion-exchanging groups were liberated by decomposition with time.

Figure 6:
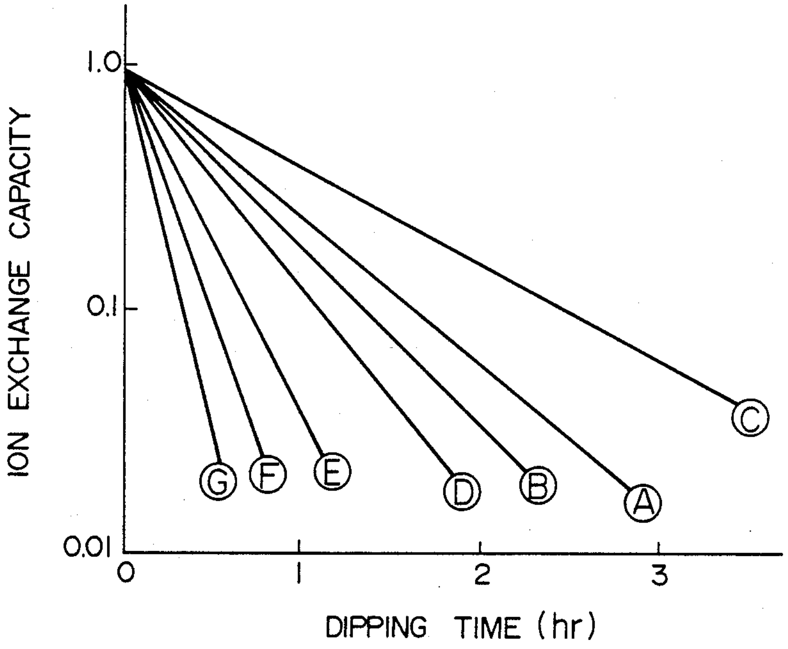
FIGS. 6 and 7 are diagrams explaining the heat resistances of various cation exchange resins.

FIG. 6 shows the test results, where the axis of abscissa shows a dipping time in the hot water and the axis of ordinate logarithmically shows changes in ion exchange capacity. It is seen from the test results that cation exchange resins readily susceptible to thermal decomposition are (E), (F) and (G), that is, the straight chain type ion exchange resins given in Table 1. Ready susceptability to thermal decomposition of the straight chain type ion exchange resins seems due to the bonding energy of the ion-exchanging groups to the polymer body (see Table 1). That is, it seems that the ion-exchanging groups bonded to the carbon atoms in a benzene ring (benzene ring type) has such a large bonding energy that they are hard to liberate by thermal decomposition, whereas the ion-exchanging groups bonded to other elements than the carbon atoms in the benzene ring (straight chain type) has such a small bonding energy that they are easy to liberate by thermal decomposition.

Figure 7:
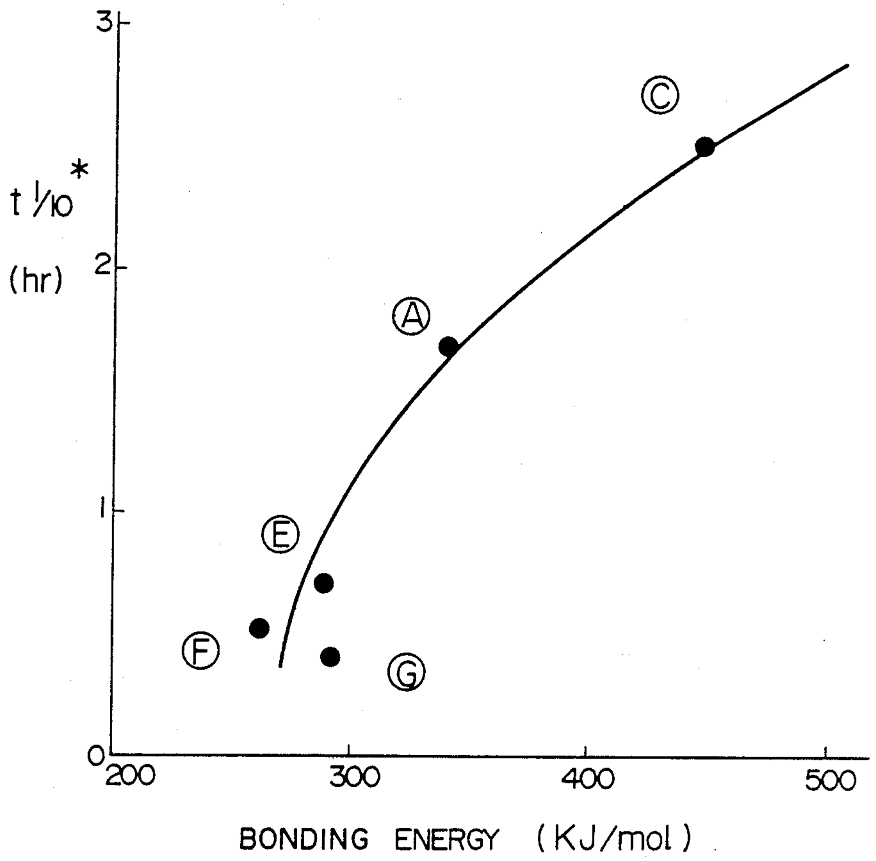

FIG. 7 shows the time $t_{1/10}$ until the ion exchange capacity becomes 1/10 for the respective ion exchange resins, obtained from changes in the ion exchange capacity shown in FIG. 6, where the axis of ordinate shows $t_{1/10}$ and the axis of abscissa shows the bonding energy of the ion-exchanging group in the corresponding ion exchange resin. It is seen from FIG. 7 that, when the bonding energy is not more than 300 KJ/mol, $t_{1/10}$ will be not more than one hour, and the ion exchange resins are readily susceptible to thermal decomposition. Particularly, straight chain type ion exchange resins are readily susceptible to thermal decomposition, because their bonding energy is usually not more than 300 KJ/mol, and even benzene ring type ion exchange resins can readily undergo thermal decomposition, so long as their bonding energy is not more than 300 KJ/mol.

It can be seen from the foregoing that it is effective for reducing the radiation exposure of operators to use straight chain type cation exchange resins or cation exchange resins whose ion-exchanging groups have a low bonding energy as cation exchange resins for the filtration desalter.

Up to now, more than 100 kinds of cation exchange resins have been known, and most of the resins now in use belong to the benzene ring type, and the straight chain types are not so many. Particularly, there have been no examples of using a straight chain type cation exchange resin in an apparatus for cleaning nuclea reactor cooling water.

The straight chain type cation exchange resins include the following types:

(1) Oxybenzylsulfonic acid type: as shown by (E) in Table 1.

(2) Acrylic carboxylic acid type: as shown by (F) in Table 1.

(3) Methacrylic carboxylic acid type: molecular structure of this type is as follows:

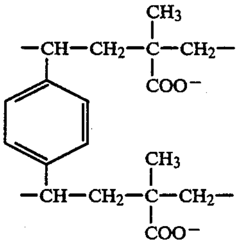

(4) Aromatic carboxylic acid type: molecular structure of this type is as follows:

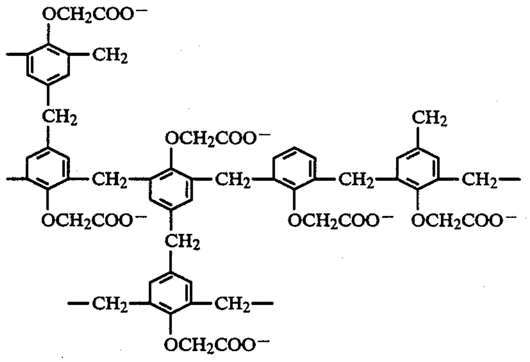

(5) So called chelate resin: as shown by (G) in Table 1, and those having the following molecular structures

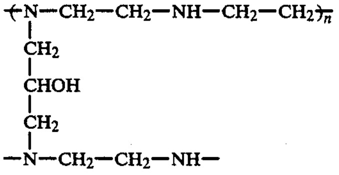

and

-continued

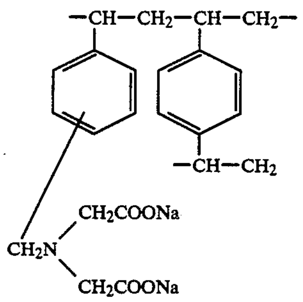

When cation exchange resin containing divinylbenzene as a molecule-constituting member is used in the present invention, the content of the divinylbenzene in the resin is 1 to 20% by weight, preferably 2 to 16% by weight, on the basis of the resin.

Which ion exchange resin is most preferable for a filtration desalter 4 shown in FIG. 2 or a desalter 5 shown in FIG. 1 will be described in detail below.

Figure 1:
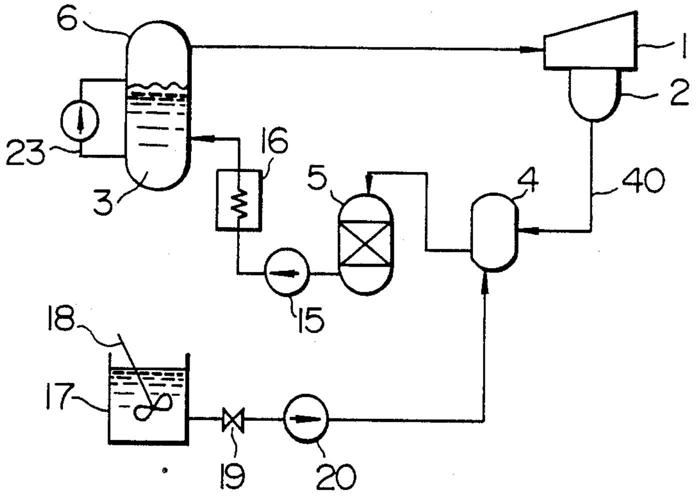
FIG. 1 is a flow diagram of an atomic power plant showing one embodiment of the present invention.

Impurities contained in the cooling water include fine granular materials such as cruds, etc., which will be hereinafter referred to as impurities a, cations produced by corrosion of materials such as $Co^{2+}$, $Fe^{2+}$, $Mn^{2+}$, etc., which will be hereinafter referred to as impurities b, and anions such as carbonate ions, silicate ions, etc., which will be hereinafter referred to as impurities c, and furthermore include neutral salts such as NaCl, etc., when sea water leaks into the cooling water from the condenser 2 as shown in FIG. 1 (the neutral salt will be hereinafter referred to as impurities d).

According to the prior art, a mixture of benzenesulfonic acid-based resin as a strongly acidic ion exchange resin and a quaternary ammonium-based ion exchange resin as a strongly basic ion exchange resin is used in the filtration desalter, as described earlier, and all of the said impurities a to d can be removed in the filtration desalter. That is, the desalter is provided in an auxiliary sense.

In the present invention, on the other hand, a desalter 5 as shown in FIG. 1 plays an important role, because the straight chain type cation exchange resin generally belongs to a weakly acidic ion exchange resin, and thus has a low ability of decomposing the impurities d (neutral salt) ($NaCl \rightarrow Na^+ + Cl^-$) to adsorb these ions. Thus, when sea water leaks into the cooling water from the condenser 2 as shown in FIG. 1, and when straight chain type ion exchange resin is used as cation exchange resin in the filtration desalter 4, the neutral salt cannot be completely removed in the filtration desalter. Thus, if there is a possibility of leakage of sea water from the condenser 2, it is preferable to use a mixture of strongly acidic granular ion exchange resin such as benzenesulfonic acid-based resin, etc., and a strongly basic granular ion exchange resin such as quaternary ammonium-based resin in the desalter 5. The neutral salts can be completely removed in the desalter 5 thereby.

In the foregoing description, mention has been not substantially made of anion exchange resin among the powdery ion exchange resins to be used in the filtration desalter 4. Even if the anion exchange resin leaks in the cooling water 3, it will not increase the radiation exposure of operators, and thus the same quaternary ammonium-based resin as so far used, or any other resins can be used satisfactorily. Other anion exchange resins than the foregoing include primary to tertiary amine-based anion exchange resins, as given below:

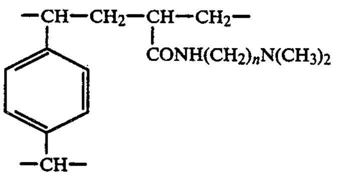
(a)

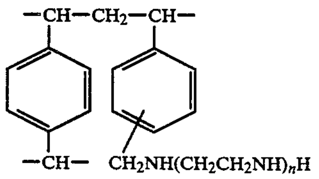
(b)

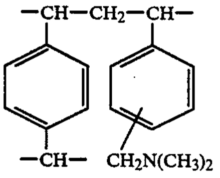
(c)

Heretofore, quaternary ammonium-based resins have been used as anion exchange resin for use in the filtration desalter, because the quaternary ammonium-based resins are strongly basic resins, and thus have a high percent removal of the neutral salts in the filtration desalter when used in mixture with the strongly acidic benzenesulfonic acid-based resin.

In the present invention, however, removal of the neutral salts (impurities d) is carried out in the desalter 5, and thus the anion exchange resin for use in the filtration desalter 4 is not limited to the quaternary ammonium-based resins.

As already described above, the radiation exposure of operators can be considerably reduced by using cation exchange resins whose ion-exchanging groups are bonded to other elements than the carbon atoms constituting a benzene ring in the filtration desalter 4 using the powdery ion exchange resins.

Furthermore, the following effects can be obtained with the said structure of the present invention.

When the powdery ion exchange resin precoated in the filtration desalter 4 is used for a prolonged period, for example, 10 to 50 days, the resin layer undergoes clogging as a result of trapping the cruds in the cooling water 3, and the pressure drop through the resin layer will be increased. When the pressure drop reaches a predetermined value, the resin layer is back-washed and the ion exchange resin is exchanged with fresh one. The used ion exchange resin is handled as a radioactive waste. About half of the radioactive wastes now discharged from the boiling water-type nuclear reactor is the used ion exchange resins discharged from the filtration desalter 4 (the used ion exchange resin will be hereinafter to as "waste resin").

As means for reducing the volume of waste resin, there has been developed a process for thermal decomposition or incineration, as disclosed in Japanese Patent Application Kokai (Laid-open) No. 59-107,300. The waste ion exchange resin according to the present invention can be readily treated by the said process for thermal decomposition or incineration. The reasons will be described below, referring to thermal decomposition treatment of benzenesulfonic acid-based resin (Ⓐ in Table 1) and acrylic carboxylic acid resin (Ⓕ in Table 1) in comparison.

Figure 8:
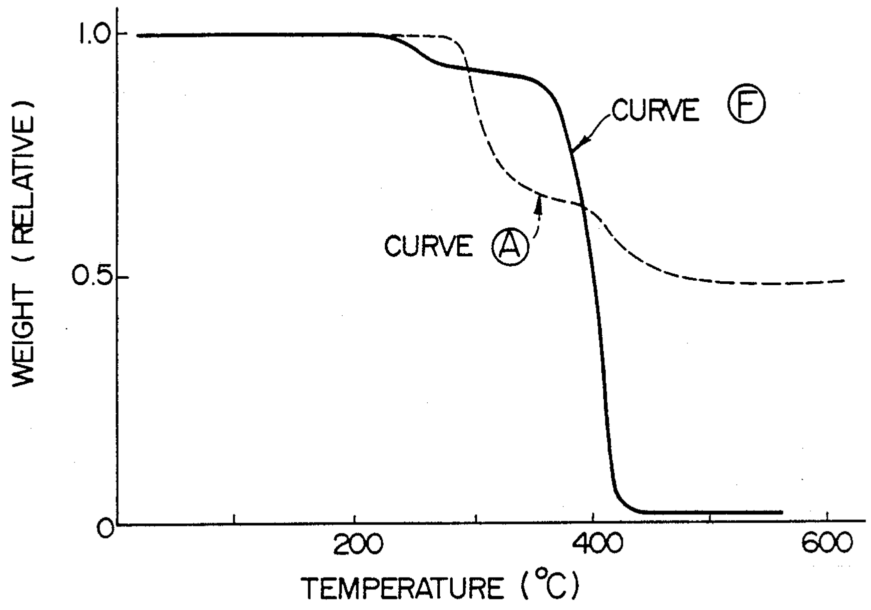
FIG. 8 is a diagram explaining the heat decomposition characteristics of cation exchange resin.

FIG. 8 is a diagram showing changes in weight by heating when the benzenesulfonic acid-based resin (curve Ⓐ) and the acrylic carboxylic acid resin (curve Ⓕ) were subjected to thermal decomposition treatment in a nitrogen gas atmosphere. As is apparent from FIG. 8, the benzenesulfonic acid-based resin produces about 50% by weight of residues, even if subjected to the thermal decomposition at 500° C. or higher, owing to its high heat resistance, whereas more than 95% by weight of the acrylic carboxylic acid resin can be decomposed, producing only small amount of the residues, when subjected to the thermal decomposition at 450° C. or higher, owing to its low heat resistance. That is, it is evident therefrom that, when the waste resin used in the present invention is subjected to a thermal decomposition treatment, the amount of the wastes can be considerably reduced.

As a result of investigations of thermal decomposition characteristics of other cation exchange resins according to the present invention, it has been found that more than 95% by weight of methacrylic carboxylic acid resin, aromatic carboxylic resin and chelate resin are decomposed and even about 70% by weight of oxybenzylsulfonic acid is decomposed when subjected to thermal decomposition at 500° C. in a nitrogen gas atmosphere. That is, any of the cation exchange resins for use in the present invention is more readily susceptible to thermal decomposition than the benzenesulfonic acid-based resin.

The same results were obtained when they were subjected to an incineration treatment in an oxygen-containing atmosphere. That is, the conventional benzenesulfonic acid-based resin was hardly incinerated owing to its high heat resistance, and a portion of the residues deposited onto the furnace wall shortened the life of the furnace material, because the incineration was carried out at 800° C. or higher, and thus a portion of the ion exchange resin was melted, and was much liable to deposit on the furnace wall. On the other hand, the cation exchange resins for use in the present invention could be readily incinerated.

Furthermore, when the conventional benzenesulfonic acid-based resin is subjected to thermal decomposition or incineration, harmful gases, such as $H_2S$, $SO_x$, etc. are evolved, because the resin contains sulfur atom. In the present invention, on the other hand, no such harmful gases as $H_2S$ and $SO_x$ are evolved at all, even if the acrylic carboxylic acid resin, aromatic carboxylic resin, etc. according to the present invention are subjected to thermal decomposition or incineration treatment, because they contain no sulfur atom. Thus, the gas treatment system can be simplified, and also corrosion of materials by $H_2S$, etc. can be prevented. When the cation exchange resins according to the present invention are used in the filtration desalter 4, not only the radiation exposure of operators can be reduced, but also the radioactive waste disposal can be facilitated.

The conventional benzenesulfonic acid-based resin is used as granular cation exchange resin in the desalter 5 also in the present invention, and thus no effect of facilitating the waste disposal can be obtained, but there is no serious problem at all, because the amount of the wastes discharged from the desalter 5 is not more than 1/10 of the amount of the wastes discharged from the filtration desalter 4. Furthermore, a trouble at the disposal of the benzenesulfonic acid-based resin discharged from the desalter 5 can be eased by treating the waste resin discharged from the desalter 5 together with the waste resin discharged from the filtration desalter 4 simultaneously, for example, by thermal decomposition or incineration. The concentration of $SO_x$ or $H_2S$ evolved from the benzenesulfonic acid-based resin can be relatively lowered by the simultaneous treatment, and thus the problems such as corrosion of materials, etc. can be eased, as compared with the single treatment of the benzenesulfonic acid-based resin.

In the foregoing, it has been described that the desirable powdery cation exchange resins for use in the filtration desalter 4 are those whose ion-exchanging groups are bonded to other elements than the carbon atoms constituting a benzene ring, but it is inevitable to use those whose ion-exchanging groups are partly bonded to the carbon atoms in the benzene ring directly on account of process conditions, etc.

In summary, the preferable modes of the present invention are as follows:

(1) Powdery cation exchange resins whose ion-exchanging groups are bonded to other elements than the carbon atoms constituting a benzene ring (straight chain type) are used in a filtration desalter in an apparatus for cleaning nuclear reactor cooling water.

(2) A mixture of benzenesulfonic acid-based cation exchange resin and quaternary ammonium-based anion exchange resin is used as granular ion exchange resins in a desalter in an apparatus for cleaning nuclear reactor cooling water.

PREFERRED EMBODIMENTS OF THE INVENTION

The present invention will be described in detail below, referring to Examples and Drawings.

EXAMPLE 1

Figure 2:
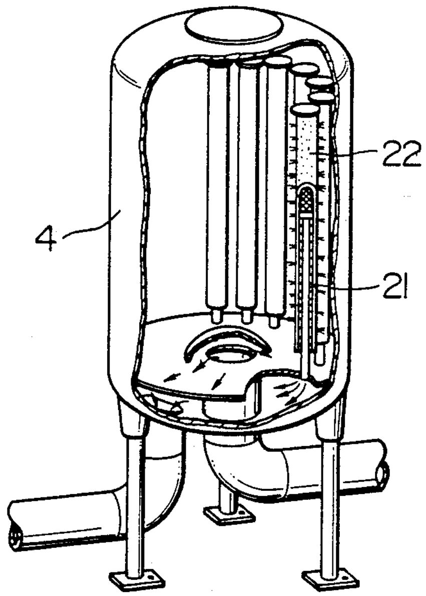
FIG. 2 is a partially cutaway view of a filtration desalter used in FIG. 1.

A first embodiment of the present invention is shown in FIGS. 1 and 2, where FIG. 1 shows a flow diagram of an apparatus for cleaning cooling water in a boiling water-type nuclear reactor, and FIG. 2 shows a partially cutaway view of a filtration desalter used in the apparatus for cleaning cooling water shown in FIG. 1.

Cooling water 3 recovered by a condensor 2 after driving a turbine 1 is cleaned by a filtration desalter 4 and a desalter 5, and returned to a nuclear reactor 6 through a feedwater heater 16 by a feedwater pump 15.

In the desalter 5 a mixture of the said granular benzenesulfonic acid-based resin and quaternary ammonium-based resin in a mixing ratio of 2:1 by weight is packed. In the filtration desalter 4, powdery ion exchange resin is precoated. That is, acrylic carboxylic acid resin (Ⓕ in Table 1) having an average particle size of about 30 μm as powdery cation exchange resin and quaternary ammonium-based resin having an average particle size of about 30 μm as powdery anion exchange resin are charged in a ratio of 2:1 by weight of the former to the latter into a precoat tank 17 at first, and further about 0.05 to about 1% by weight of a water-soluble polymeric electrolyte such as polyacrylic acid, polymerized maleic acid, etc. is added therto. Then, the mixture is stirred by a stirrer 18. As a result, flocs composed of the mixture of cation exchange resins 9 and anion exchange resins 10 are formed. The flocs are supplied to the filtration desalter 4 through a valve 19 by a precoat pump 20. Nylon or stainless steel filtration elements 21 are provided in the filtration desalter 4, as shown in FIG. 2, and are precoated with the flocs 22.

The boiling water-type nuclear reactor provided with the apparatus for cleaning cooling water, as described above, was operated for one year, and the surface dosages of various pipings were measured. It was found that the dosage of recycle piping 23 was highest and was 20 mR/h. When a conventional apparatus for cleaning cooling water, using benzenesulfonic acid-based resin and quaternary ammonium-based resin in the filtration desalter 4, was used, the surface dosage of recycle piping 23 was 30 mR/h. The nuclear reactor 6 was operated while changing the species of the powdery ion exchange resin in the filtration desalter 4, and the surface dosage of recycle piping 23 was measured. The results are shown in Table 2.

TABLE 2

| | Filtration desalter: Cation exchange resin | Filtration desalter: Anion exchange resin | Surface dosage of recycle piping (mR/h) |
|---|---|---|---|
| Conventional | Benzenesulfonic acid-based resin | Quaternary ammonium-based resin | 30 |
| The Invention | Acrylic carboxylic acid resin | Quaternary ammonium-based resin | 20 |
| | Oxybenzyl-sulfonic acid resin | Quaternary ammonium-based resin | 25 |
| | Methacrylic carboxylic acid resin | Tertiary amine-based resin | 20 |
| | Aromatic carboxylic acid resin | Secondary amine-based resin | 20 |
| | Chelate resin | Primary amine-based resin | 25 |

As is obvious from Table 2, the radiation exposure of operators according to the present invention can be reduced to ⅓-1/6 of that according to the prior art. For example, when the surface dosage of recycle piping is 20 mR/h, the annual radiation exposure of operators amounts to about 60 to about 100 man.rem.

Figure 9:
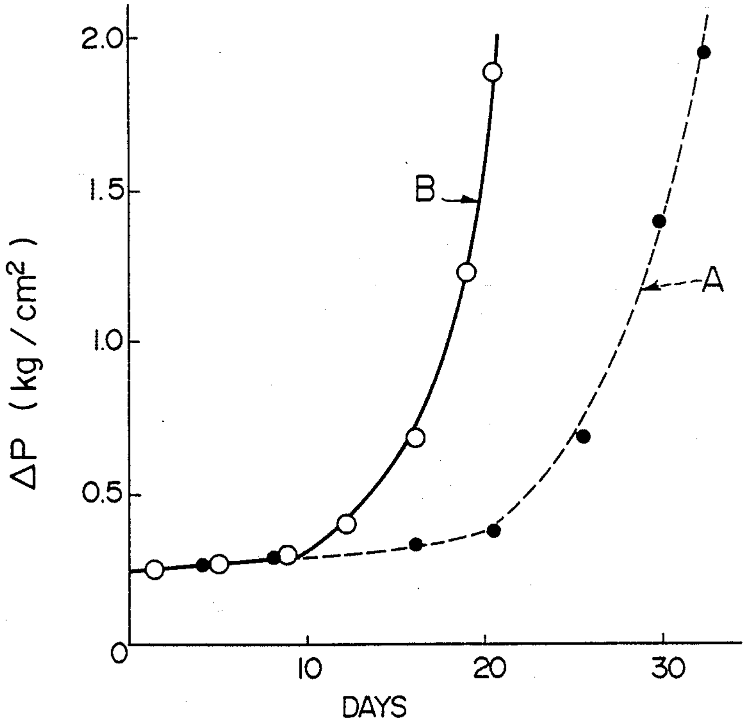
FIG. 9 is a diagram explaining an increase in pressure drop in a filtration desalter according to the present invention, as compared with the conventional filtration desalter.

In the present invention, it has been found that the life of powdery ion exchange resin for use in the filtration desalter 4 can be prolonged, as will be described below, referring to FIG. 9, where the dotted line curve A shows changes in differential pressure when cooling water 3 was cleaned by a precoat of a mixture of acrylic carboxylic acid resin and quaternary ammonium-based resin in a mixing ratio of 2:1 by weight of the former to the latter, and the full line curve B shows changes in differential pressure when a precoat of a mixture of the conventional powdery ion exchange resins (benzenesulfonic acid-based resin and quaternary amine-based resin) was used. It is obvious from FIG. 9 that the differential pressure curve of the present invention rises much later than that of the prior art, and the life can be about 1.5-fold prolonged. Thus, in the present invention, the filtration life of the powdery ion exchange resin can be prolonged, and not only the cost can be reduced, but also the resin can be used for a longer time, and consequently the amount of the waste resin can be decreased. That is, the amount of the radioactive wastes can be effectively reduced.

In the foregoing description, a combination of acrylic carboxylic acid resin and quaternary ammonium-based resin has been exemplified as the powdery ion exchange resins for use in the filtration desalter 4. Equivalent effects can be also obtained from combinations of other kinds of ion exchange resins according to the present invention. That is, 5 kinds of powdery cation exchange resins, such as oxybenzylsulfonic acid resin, acrylic carboxylic acid resin, methacrylic carboxylic resin, etc., and 4 kinds of powdery anion exchange resins such as quaternary ammonium-based resin, tertiary amine resin, etc. were selected, and their filtration lives were experimentally determined on the basis of combinations thereof. The results are shown in Table 3, where the filtration lives on the basis of various combinations according to the present invention are shown as relative values to the filtration life of the conventional powdery ion exchange resin as unity.

TABLE 3

| Filtration Life | Quaternary ammonium-based resin | Tertiary amine-based resin | Secondary amine-based resin | Primary amine-based resin |
|---|---|---|---|---|
| Oxybonzyl-sulfonic acid resin | 1.2 | 1.2 | 1.1 | 1.1 |
| Acrylic carboxylic acid resin | 1.5 | 1.6 | 1.4 | 1.5 |
| Methacrylic carboxylic acid resin | 1.8 | 1.6 | 1.6 | 1.4 |
| Aromatic carboxylic acid resin | 1.4 | 1.2 | 1.3 | 1.3 |
| Chelate resin | 1.4 | 1.3 | 1.2 | 1.4 |

*Filtration life: Relative to the conventional resin as unity.

As is obvious from Table 3, any of the combinations according to the present invention can make the filtration life 1.1 to 1.8-fold longer.

In the present embodiment, not only the radiation exposure of operators can be reduced to ⅓-1/6 of that of the prior art, but also the life of ion exchange resin in the filtration desalter can be made about 1.5-fold longer, as described above, and thus cost and the amount of discharged radioactive waste can be reduced to about ⅓.

Tests were carried out in the present apparatus on the condition that sea water leaked into the cooling water 3 from the condenser 2, but no trouble appeared. When sea water leaked in the cooling water from the condenser 2, neutral salts such as NaCl, etc. in the cooling water could be removed in the filtration desalter 4 in the conventional apparatus, whereas in the present invention the neutral salts could not be removed, because weakly acidic cation exchange resin was used in the filtration desalter 4. However, in this embodiment of the present invention, the strongly acidic benzenesulfonic acid-based resin and the strongly basic quaternary ammonium-based resin were used in the desalter 5 and thus the neutral salts that could not be removed in the filtration desalter 4 could be completely removed in the desalter 5. That is, there was no problem at all, even when sea water leakage took place.

In this embodiment of the present invention, three components, i.e. cation exchange resin, anion exchange resin and polymeric electrolyte, were mixed in the precoat tank 17, but when both or any one of the cation exchange resin and the anion exchange resin, to which the polymeric electrolyte has been added in advance, for example, by surface treatment, etc., are used, only two components, i.e. the cation exchange resin and the anion exchange resin, are to be mixed in the precoat tank 17.

EXAMPLE 2

This embodiment had the same basic structure as in Example 1, but the mixing ratio of powdery cation exchange resin to the cation exchange resin to be used in the filtration desalter 4 was changed from that of Example 1.

Figure 10:
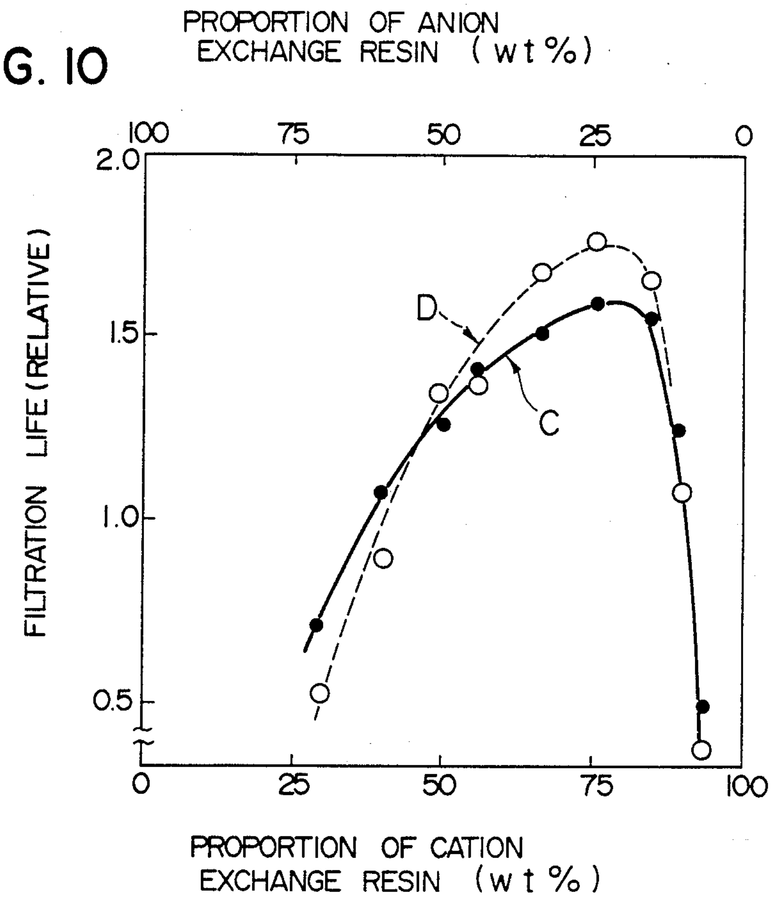
FIG. 10 is a diagram showing relationships between the mixing ratio of anion and cation exchange resins and the filtration life.

In Example 1, it was shown that the life of the powdery ion exchange resins to be used in the filtration desalter 4 could be prolonged in the present invention. In this embodiment changes in the life of the powdery ion exchange resins were investigated by changing the mixing ratio of the powdery cation exchange resin to the powdery anion exchange resin. The same test procedure as shown in FIG. 9 was used, where the differential pressure changing curves were experimentally plotted to determine the life of the resins. The test results are shown in FIG. 10, where the axis of abscissa shows the resin proportion and the axis of ordinate shows the filtration life. The filtration life on the axis of ordinate shows a life relative to the life of the powdery ion exchange resins used in the filtration desalter in the conventional apparatus, i.e. a mixture of 67% by weight benzenesulfonic acid-based resin and 33% by weight of quaternary ammonium-based resin, as unity. In FIG. 10, the full line curve C shows powdery ion exchange resins based on combinations of acrylic carboxylic acid resin and quaternary ammonium-based resin, and the dotted line curve D shows powdery ion exchange resins based on combinations of methacrylic carboxylic acid resin and tertiary amine resin.

As is obvious from FIG. 10, the filtration life could be prolonged by setting the ratio of the cation exchange resin to the anion exchange resin to 50:50– 90:10% by weight. The reasons why the filtration life depended on the mixing ratio of the cation exchange resin to the anion exchange resin seems as follows: there are much more cations such as $Co^{2+}$, $Fe^{2+}$, etc. as impurities in the cooling water 3 than anions, and if the cation exchange resin and the anion exchange resin are used in equal weights, the cation exchange resin will adsorb such a larger number of ions than the anion exchange resin. Once at least any one of the cation exchange resin and the anion exchange resin adsorbs much more ions, the filtration capacity seems to be lowered. In order to prolong the filtration life, the ratio of the cation exchange resin must be 50% or more.

According to the prior art, neutral salts such as NaCl, etc. from sea water leakage is designed to be removed in the filtration desalter 4, where equal equivalent weights of cations ($Na^+$) and anions ($Cl^-$) must be removed. Thus, the ratio of the cation exchange resin cannot be made too large. However, in the present invention, the neutral salts are designed to be removed not in the filtration desalter 4, but in the desalter 5, and thus the ratio of the cation exchange resin in the filtration desalter can be made considerably larger without any problem.

It is also seen from FIG. 10 that the filtration life will be shortened when the ratio of the cation exchange resin exceeds 90% by weight. This is because no suitable flocs (coagulates of cation exchange resin and anion exchange resin) for the filtration can be formed owing to too small an amount of the anion exchange resin.

As described above, it is desirable that the ratio of the powdery cation exchange resin to the powdery anion exchange resin is 50:50 to 90:10% by weight, preferably 60:40 to 85:15% by weight, whereby the filtration life can be considerably prolonged.

EXAMPLE 3

Figure 11:
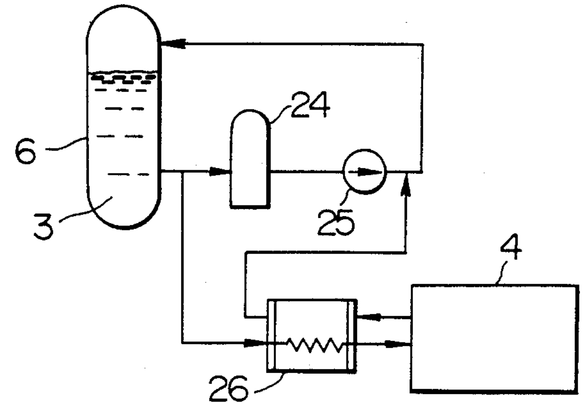
FIG. 11 is a flow diagram of an atomic power plant according to another embodiment of the present invention.

This embodiment shows a case of applying the present invention to an apparatus for cleaning cooling water in a pressurized water-type nuclear reactor, whose flow diagram is shown in FIG. 11.

Cooling water 3 heated in nuclear reactor 6 is recycled to the nuclear reactor 6 through a steam generator 24 by a primary cooling water pump 25, but a portion of the cooling water 3 is supplied to a filtration desalter 4 through a heat exchanger 26. In the filtration desalter 4, a mixture of cation exchange resin and anion exchange resin having the following molecular structures is used in a ratio of the former to the latter of 3:1 by weight as powdery ion exchange resins:

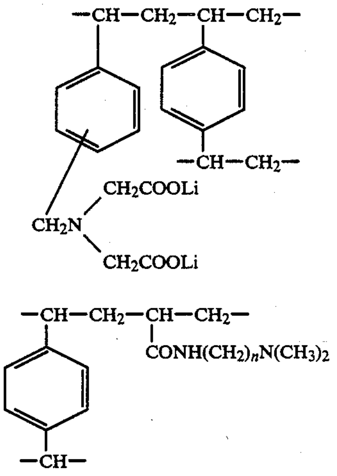

According to the prior art, the pressurized water-type nuclear reactor uses a mixed bed desalter using granular ion exchange resins in place of the filtration desalter 4, but the capacity of removing cruds in the cooling water can be considerably increased by using the filtration desalter of this Example, and also the radiation exposure of operators can be largely reduced.

The present apparatus for cleaning cooling water can be applied also to a core water-cleaning system in a boiling water-type nuclear reactor. According to the prior art, a portion of cooling water in the nuclear reactor recycle system is cleaned in the filtration desalter in the boiling water-type nuclear reactor, and a mixture of benzenesulfonic acid-based resin and quaternary amine-based resin is used as powdery ion exchange resins for the filtration desalter. However, a portion of the ion exchange resins leaks in the cooling water even in the filtration desalter, and there is a consequent possibility to increase the radiation exposure of operators. When the ion exchange resins according to the present invention are used in the filtration desalter in the core water-cleaning system for cleaning a portion of the cooling water in the recycle system, an increase in the radiation exposure of operators can be minimized, even if the ion exchange resin leakage takes place. Furthermore, the life of the filtration desalter in the core water-cleaning system can be prolonged as in Example 2, and the waste disposal can be also facilitated thereby.

EXAMPLE 4

In Example 1, a combination of the filtration desalter 4 and the desalter 5 arranged in series as an apparatus for cleaning nuclear reactor cooling water is exemplified, but the desalter 5 is not always required, and only the filtration desalter 4 can perform the required duty. That is, the filtration desalter 4 also uses ion exchange resins as in the desalter 5, and most of ions and cruds can be removed in the filtration desalter 4, because the desalter has only a backing function. When the ion exchange resins according to the present invention are used in the filtration desalter 4, the neutral salts are not completely removed therein, and thus the desalter 5 can be only omitted when there is a very low possibility for the sea water leakage from the condenser 2, or when corrosion-resistant materials, such as stainless steel, etc. are used in the condenser 2, or when there is no possibility at all for the sea water leakage, for example, when river water or well water is used in place of the sea water as the condenser cooling water.

According to this embodiment of the present invention, the same effect as in Example 1 can be obtained, and the cost can be much more reduced by omitting the desalter 5.

EXAMPLE 5

When the ion exchange resins used in the apparatus for cleaning nuclear reactor cooling water run down, the waste ion exchange resins are treated as radioactive wastes. The radioactive wastes are now stored and preserved in atomic power plants, and the amount of such wastes is increasing year after year.

Figure 12:
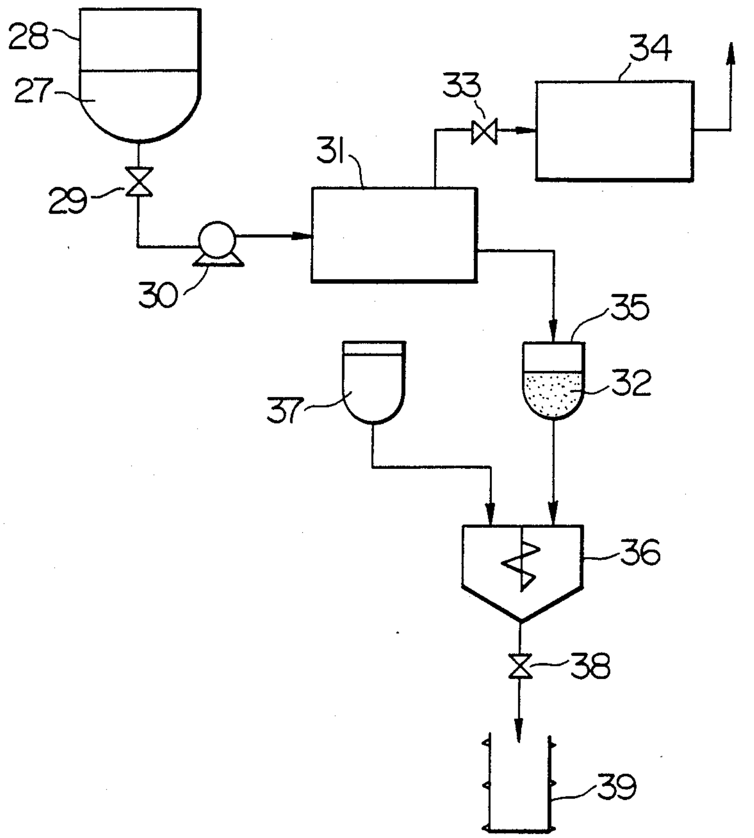
FIG. 12 is a flow diagram of a waste disposal system used to thermally decompose the waste ion exchange resin in the present invention.

This embodiment concerns a thermal decomposition treatment of waste ion exchange resins (waste resins) discharged from the filtration desalter 4 shown in Example 1, and will be explained, referring to the flow diagram shown in FIG. 12.

Waste resins 27 are in a slurry state, because they are discharged from the filtration desalter 4 by backwashing, and are stored in a waste resin tank 28 for a while. The waste resins in the waste resin tank 28 are supplied in the slurry state at a concentration of about 10% by weight through a valve 29 at a constant flow rate to a thermal decomposition unit 31 by a slurry pump 30. The waste resins used in this embodiment are composed of 60% by weight of acrylic carboxylic acid resin, 30% by weight of quaternary ammonium-based resin, and 10% by weight of impurities such as cruds, etc. The thermal decomposition unit 31 is a rotary kiln of continuous treatment type, operated at 500° C. In the thermal decomposition unit 31 an inert gas atmosphere is kept by nitroge gas purging. The waste resins 27 supplied to the thermal decomposition unit 31 are subjected to drying and thermal decomposition at the same time, and the thermal decomposition residues are stored in a powder hopper 35 for a while. A flue gas evolved at the thermal decomposition is composed mainly of steam and hydrocarbons, and led through a valve 33 to a flue gas-treating unit 34 and treated. After the thermal decomposition residues 32 are stored in the powder hopper 35 for a while, they are mixed with cement 37 or plastics, or the like in a mixer 36 and then poured into a drum 39 through a valve 38, and solidified.

The functions and effects of this embodiment will be described below:

By thermal decomposition of the waste resins 27 in the thermal decomposition unit 31, the waste resins 27 can be reduced to 20% by weight and 10% by volume of the charged entire waste resins, whereas the waste resins 27 whose cation exchange resin is the conventional benzenesulfonic acid-based resin is reduced only to 40% by weight and 25% by volume of the charged entire waste resins by the thermal decomposition. In the case of the waste resins according to this embodiment the flue gas evolved by the thermal decomposition contains only steam and hydrocarbons, whereas in the case of the waste resins containing the benzenesulfonic acid-based resin $SO_x$ or $H_2S$ is evolved by the thermal decomposition in addition to the steam and the hydrocarbons owing to the sulfur atoms contained therein, as is obvious from the said structure. $SO_x$ or $H_2S$ is a harmful gas component, and its removal requires an alkali scrubber, etc., complicating the flue gas-treating unit 34. The present invention has no such problems.

Thus, such effects as considerable reduction in the volume of waste resins and simplification of the flue gas-treating unit can be obtained by using the ion exchange resins according to the present invention and by thermal decomposition of the waste resins.

In this embodiment, the waste resins discharged from the filtration desalter in the boiling water-type nuclear reactor have been exemplified, but the waste resins discharged from the filtration desalter in the pressurized water-type nuclear reactor shown in Example 3 can be likewise treated according to the present invention.

EXAMPLE 6

In Example 5, the waste resins 27 are treated by thermal decomposition, but the same effects as in Example 5 can be obtained by incineration treatment in place of the thermal decomposition. In this case an incineration furnace is used in place of the thermal decomposition unit 31, and the waste resins are incinerated at 600° C. or higher in the air. So far as the ion exchange resins according to the present invention are used, a considerable reduction in the volume can be attained, and also the flue gas-treating unit can be simplified.

In this embodiment, the following effects can be further obtained. In the case of incineration, waste resins are treated at 600° C. or higher, usually at 800° to 1,500° C., and thus a portion of the waste resins is melted and the melted resin deposits on the furnace wall, shortening the life of the incineration furnace. The ion exchange resins according to the present invention have a low heat resistance, and thus can be readily gasified below 600° C. That is, the present ion exchange resins are not substantially melted. Thus, the trouble of waste resin deposition on the furnace wall can be considerably reduced, and the life of the incineration furnace can be prolonged.

EXAMPLE 7

In the foregoing embodiments, the straight chain type cation exchange resins are used in the filtration desalter, but a filter of membrane structure capable of mechanically removing cruds, such as hollow fiber filter, etc. can be used as a filtration desalter. In this embodiment, there is no leakage of ion exchange resin into the cooling water or no function to increase the surface dosage of pipings as in the case of the powdery ion exchange resins. Furthermore, when polymers whose ion-exchanging groups are bonded to other elements than carbon atoms constituting the benzene rings are used as the filter of membrane structure having ion-exchanging groups, a high volume reduction effect can be obtained at the disposal of the resulting waste polymers. That is, the same functions and effects as in Examples 5 and 6 can be obtained owing to the use of straight chain type polymers as Ⓔ, Ⓕ and Ⓖ in Table 1. Thus, in this embodiment of using polymers whose ion-exchanging groups are bonded to the straight chains, equivalent or superior effects to those of the foregoing Examples can be obtained.

In Example 1, powdery straight chain type cation exchange resins having an average particle size of about 30 μm are used, but the present invention is not limited to the said particle size. For example, fibrous straight chain type cation exchange resins, which are extended in one direction, can be used. Such fibrous straight chain type cation exchange resin is effective for reducing the resin leakage from the filtration desalter. Both or any one of cation exchange resin and anion exchange resin can be such a fibrous ion exchange resin.

When the fibrous cation exchange resin is long enough not to pass through nylon or stainless steel filtration elements, the cation exchange resin can be used alone. That is, since the cruds to be removed are positively charged and also ion species such as Co, etc. are positively charged, they can be removed only by the cation exchange resin. The amount of waste resins can be largely reduced in this manner without using the anion exchange resins.

Furthermore, the straight chain type cation exchange resins have a lower degree of dissociation (smaller $pK_A$, where $pK_A$ is a logarithm of the reciprocal of the dissociation constant) than the sulfonic acid bonded to the benzene ring, and are of weakly acidic type. Thus, their ability to decompose the neutral salts is lowered, as already described, and it is hard to remove NaCl when sea water leaks into the cooling water. In other words, if the straight chain type ion exchange resins can have ion exchanging groups of higher degree of dissociation ($pK_A$ of less than 3), removal of NaCl can be made without providing a condensate desalter on the downstream side. That is, when a possibility of large sea water leakage is substantially eliminated by an increased reliability of apparatuses and machinery of an atomic power plant in the future, the condensate desalter 5 as shown in FIG. 1 can be omitted by using the straight chain type cation exchange resins having ion exchanging groups of high degree of dissociation in the filtration desalter.

EXAMPLE 8

Characteristics of filtration desalter 4 can be further improved by optimizing the particle size of the ion exchange resin according to the present invention, or by adding fibers thereto.

Characteristics required for the filtration desalter 4 are the following two:

The first is a longer filtration life. The longer the filtration time, the more the amount of cruds adsorbed in and removed by the precoat layer. Thus, clogging takes place in the precoat layer, increasing the filtration differential pressure (pressure drop). When the differential pressure reaches a predetermined value (usually 1.75 kg/cm$^2$), the powdery ion exchange resins as a precoat material is back-washed, and discharged, and exchanged with a new precoat material. Thus, in order to reduce the cost and the amount of the discharged wastes, it is desirable that the differential pressure increases slowly, that is, the filtration life is longer.

The second characteristic as required is a higher percent removal of cruds from the cooling water to be treated, and usually percent removal of 90% or higher is required.

The present inventors have found, as a result of basic tests, that when the cation exchange resins according to the present invention are used, a longer filtration life can be obtained as desired than that of the conventional strongly acidic sulfonic acid-based resin, but sometime cracks are developed in the precoat layer during the filtration, lowering the percent removal of cruds to 60–90%, and continuous use of the filtration desalter in such a state becomes inappropriate.

The cation exchange resins according to the present invention include carboxylic acid-based resin, chelate resin, etc., and at first the case of using carboxylic acid-based resin will be described below:

Methacrylic carboxylic acid resin, acrylic carboxylic acid resin, etc. are known as the carboxylic acid-based resin. Characteristics of these resins used as the precoat material are substantially equal to one another, and thus will be hereinafter referred to all together as "carboxylic acid-based resin". The known carboxylic acid-based resin is the so called granular resin having particle sizes of about 500 μm, but such granular resin is not suitable for the precoat and has an insufficient filtration effect owing to the larger particle size, and is also not practical owing to the low efficiency in ion exchange reaction.

Figure 13:
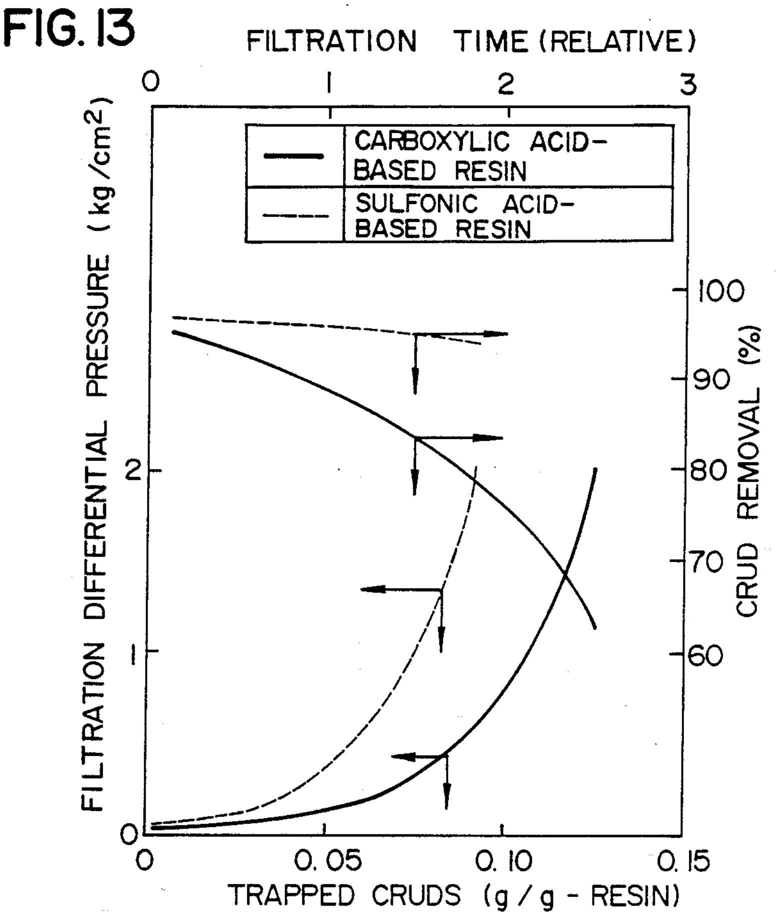
FIG. 13 is a diagram showing changes in the crud removal with time.

Thus, the carboxylic acid-based resin is pulverized to prepare powdery carboxylic acid-based resin having an average particle size of about 50 μm. The thus prepared resin is mixed with powdery anion exchange resin in a ratio of the former to the latter of 2:1 by weight, and a small amount of a polymeric coagulating agent such as polyacrylamide, etc. is added to the mixture to prepare a precoat material. Water containing cruds is treated with the thus obtained precoat material. The results are shown in FIG. 13, as compared with the results of using the conventional sulfonic acid-based resin as cation exchange resin. As is obvious from FIG. 13, the filtration differential pressure increases with filtration time, but the filtration differential pressure of carboxylic acid-based resin increases more slowly than that of sulfonic acid-based resin. The filtration life of the carboxylic acid-based resin is about 1.5 times as long as that of sulfonic acid-based resin, where the filtration time is defined as the filtration time or the trapped crud amount at the time when the filtration differential pressure reaches 1.75 kg/cm$^2$, and thus a better result can be obtained in the present invention.

However, the percent crud removal decreases with filtration time, and reaches about 75% in the case of carboxylic acid-based resin at the time when the filtration differnetial pressure reaches 1.75 kg/cm$^2$, and the percent crud removal of 90% or higher as generally required cannot be attained. It has been found that the low percent crud removal is caused by development of cracks in the precoat layer with increasing filtration time. The detail will be described below, referring to FIG. 14.

Figure 14:
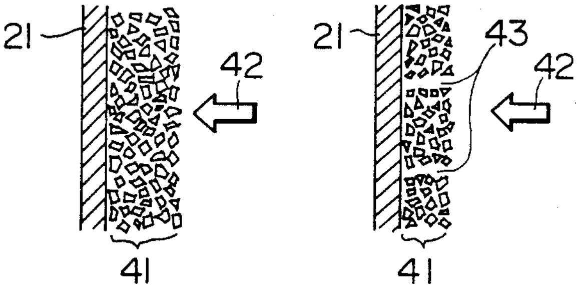
FIGS. 14(*a*) and (*b*) are showing the state of precoat layer cross-section.

Generally, water 42 is filtered after a precoat layer 41 having a thickness of 2 to 20 mm has been formed on a filtration element 21, as shown in FIG. 14(*a*). The precoat layer is shrunk with increasing filtration time, and thus cracks 43 are developed, as shown in FIG. 14(*b*), lowering the percent crud removal. Such phenomena are known also in the case of the conventional sulfonic acid-based resin, and known effective means for preventing development of cracks 43 is addition of fibers thereto. The results of sulfonic acid-based resin shown in FIG. 13 are based on the precoat layer containing fibers. It is known that in the case of the conventional sulfonic acid-based resin it is appropriate to add 30 to 60% by weight, preferably 50% by weight, of fibers thereto.

Figure 15:
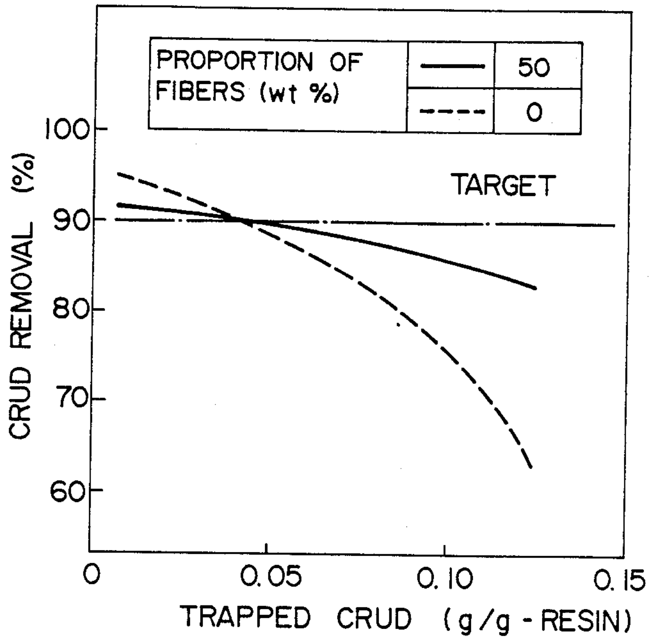
FIG. 15 is a diagram showing relationships between the trapped crud amount and the crud removal.

The present inventors carried out filtration tests in the following manner. After mixing carboxylic acid-based resin with anion exchange resin, 50% by weight of acrylic fibers (size: about 10 μm, length: about 100 μm) was added to the mixture on the total basis to prepare a precoat material. The results are shown in FIG. 15, together with the results obtained without any addition of the fibers. It is obvious from FIG. 15 that the percent crud removal can be considerably improved by the addition of fibers, and crack development in the precoat layer can be prevented.

However, even in the proportion of fibers of 50% by weight, which is deemed most appropriate in the case of the sulfonic acid-based resin, percent crud removal of more than 90% as generally required could not always be obtained, as in obvious from FIG. 15. The present inventors tried to clarify its causes and find out a step for solving this problem.

To clarify the causes for crack development in the precoat layer in the case of carboxylic acid-based resin, the present inventors at first investigated causes for crack development in the case of the conventional sulfonic acid-based resins. As a result, it was found that the crack development was caused by shrinkage of precoat layer 41, and the cause for the shrinkage of precoat layer 41 was due to the synergistic effect of the following two factors. That is, the first factor is that, among ion exchange resins, cation exchange resin particles have negatively charged surfaces, whereas anion exchange resin particles have positively charged particles, and the precoat layer composed of a mixture of these two is a loose layer of so called flocs by electric repulsive forces. When cruds are adsorbed on the precoat layer, the surface electric charges are offset, and the electric repulsive forces are reduced, whereby the precoat layer is shrunk and turns into a dense layer.

The second factor is that the conventional sulfonic acid-based resin is a shrinkable resins in which the resin particles shrink when they adsorb the cruds, and thus the precoat layer is shrunk thereby, causing crack development. In the case of the conventional sulfonic acid-based resin, cracks develop by reduction in the electric repulsive forces by the crud adsorption and shrinkage of the resin itself, and fibers are added thereto to prevent the crack developments.

Figure 16:
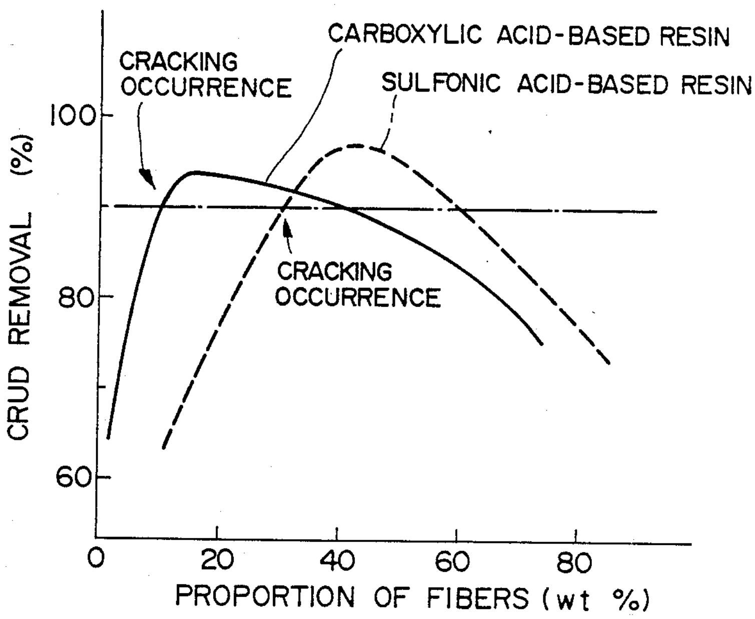
FIG. 16 is a diagram showing optimum proportion of fibers.

In the case of carboxylic acid-based resin, on the other hand, the mechanism of crack development was found to be quite different from the foregoing. That is, the said first factor (reduction in the electric repulsive force) was quite identical with the foregoing, but the second factor was quite different. That is, even if the carboxylic acid-based resin adsorbs cruds, the resin particles are not shrunk, but rather expand. That is, the carboxylic acid-based resin is an expandable resin. Thus, the second factor acts to lessen the shrinkage of the precoat layer, and it has been found that the carboxylic acid-based resin has less precoat layer shrinkage than the sulfonic acid-based resin. The present inventors presumed that, in contrast to the appropriate proportion of fibers of 30 to 60% by weight (dry basis) in the case of sulfonic acid-based resin, crack development in the precoat layer could be prevented by a much small proportion of fibers in the case of carboxylic acid-based resin. The present inventors conducted filtration tests by changing the proportion of fibers. The results are shown in FIG. 16, where the percent crud removal is shown as a function of proportion of fibers when the filtration differential pressure reaches 1.75 kg/cm$^2$ in the precoat layer. It has been found that in the case of sulfonic acid-based resin, cracks develop in the precoat layer in a proportion of below 30% by weight (dry basis), and the percent crud removal is drastically lowered, whereas in the case of carboxylic acid-based resin no cracks develop even in a smaller proportion of fibers, as presumed, and the percent crud removal of 90% can be obtained even in the proportion of fibers of 10% by weight (dry basis). On the other hand, the percent crud removal is again lowered even in the region of a larger proportion of fibers, as shown in FIG. 16. The cause for such lowering is that the proportion of ion exchange resin having a high filtrability is decreased with increasing proportion of fibers. In the case of sulfonic acid-based resin, the percent crud removal becomes less than 90% in the proportion of fibers above 60% by weight (dry basis), whereas in the case of carboxylic acid-based resin the percent crud removal becomes less than 90% in the proportion of fibers above 40% by weight (dry basis). The reasons are that the sulfonic acid-based resin is a strongly acidic resin and thus has a high ability to remove cruds, and the desired ability can be maintained even if the proportion of fibers is rather increased, whereas the carboxylic acid-based resin is a weakly acidic resin, and has a rather low ability to remove cruds, and thus the proportion of fibers cannot be made too large.

As described above, it has been found that the carboxylic acid-based resin and the sulfonic acid-based resin have different optimum proportions of fibers from each other owing to different physical properties. That is, in the case of carboxylic acid-based resin, percent crud removal of 90% or higher can be obtained, if the proportion of fibers is in a range of 10 to 40% by weight (dry basis), and such a range is quite preferable when applied to a filtration desalter. Any of acrylic fibers, nylon fibers, plant fibers, carbon fibers, etc. can be used as fibers for use in the present invention, and the fiber size can be in a range of a few μm to a few tens μm and the length can be in a range of a few tens μm to a few mm, as in the conventional size and length.

The optimum proportion of fibers has been clarified in the foregoing, and the carboxylic acid-based resin has such an essential defect that the ability to remove cruds is rather low, as already mentioned above. That is, in the case of carboxylic acid-based resin, the percent crud removal reaches maximum 93% when the proportion of fibers is about 20% by weight (dry basis), whereas in the case of sulfonic acid-based resin maximum 97% crud removal can be obtained, as is obvious from FIG. 16.

Figure 17:
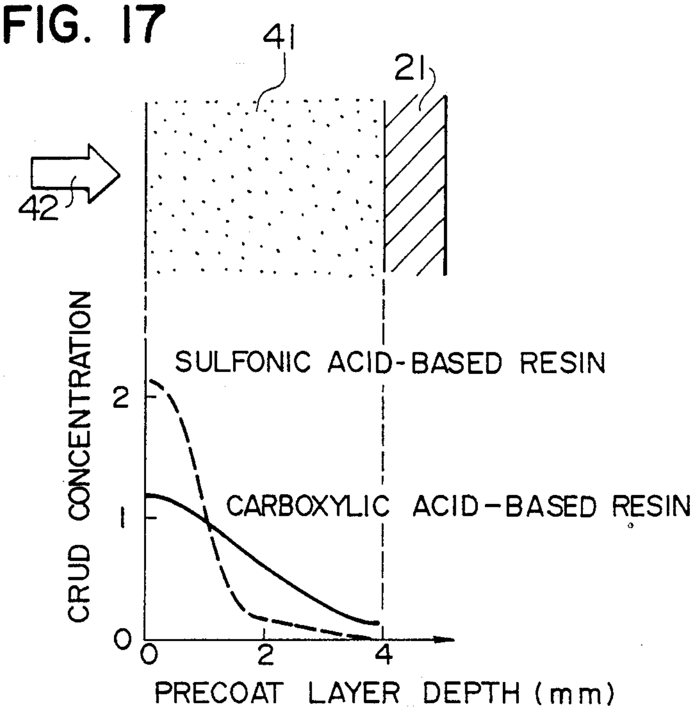
FIG. 17 is a diagram showing the crud distribution in the precoat layer cross-section.

To investigate the reason fully, the present inventors investigated distribution of cruds adsorbed through the precoat layer. The results are shown in FIG. 17, where the axis of ordinate shows the concentration of adsorbed cruds, and the axis of abscissa shows the depth of precoat layer 41 from the surface toward the filtration element 21. It is seen therefrom that, since the sulfonic acid-based resin is a highly acidic resin, it has a high ability to remove cruds, and thus most of cruds are adsorbed near the surface of the precoat layer 41, whereas the carboxylic acid-based resin is a weakly acidic resin, cruds are adsorbed throughout the precoat layer, and a portion of cruds reaches even the filtration element 21. That is, since the carboxylic acid-based resin is weakly acidic, cruds cannot be completely adsorbed in the precoat layer, and a portion of the cruds reaches the filtration element. That is, the percent crud removal is low.

To give such carboxylic acid-based resin an equivalent ability to remove cruds to that of the conventional sulfonic acid-based resin, the present inventors presumed that reduction in particle size of the resin would be a preferable step. In the conventional sulfonic acid-based resin, powdery resins having particle sizes of 60 to 400 meshes, that is, an average particle size of 50 to 150 μm have been used from the viewpoint of precoatability, etc. In the case of carboxylic acid-based resin having a rather low ability to remove cruds, the present inventors presumed that an effective ability to remove cruds could be increased by reducing the particle size, thereby increasing the reactive surface area, and consequently a higher percent crud removal than that of the sulfonic acid-based resin could be obtained. Thus, the present inventors conducted filtration tests by changing the particle sizes of carboxylic acid-based resins. The results are shown in FIG. 18, where the proportion of fibers was always kept at 20% by weight.

Figure 18:
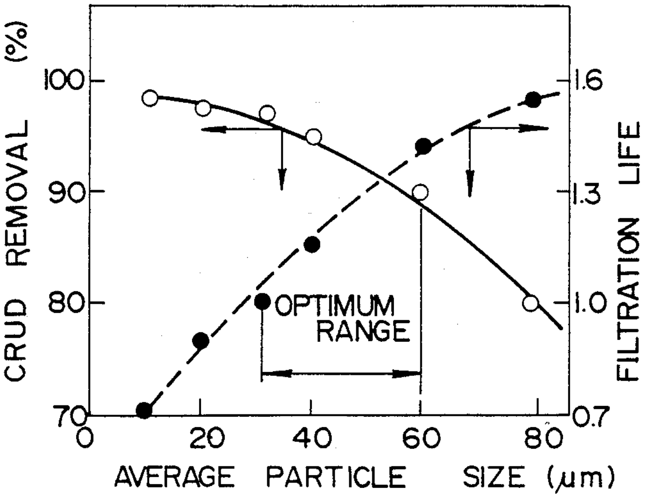
FIG. 18 is a diagram showing an optimum particle size range.

The percent crud removal shown in FIG. 18 shows values obtained when the filtration differential pressure reaches 1.75 $kg/cm^2$, and the filtration life is defined as follows. In the conventional sulfonic acid-based resin, powdery resin having particle sizes of 60 to 400 meshes, preferably 100 to 200 meshes, that is, an average particle size of about 80 μm, as disclosed in Japanese Patent Publication No. 47-44903, are used. Thus, the filtration life of sulfonic acid-based resin having an average particle size of 80 μm is presumed to be unity, and the filtration life of carboxylic acid-based resin is shown as a relative value thereto. As is obvious from FIG. 18, the smaller the average particle size, the larger the reactive surface area and the higher the percent crud removal. To obtain percent crud removal of 90% or higher, it has been found that it is desirable that the average particle size is not more than 60 μm. On the other hand, the larger the average particle size, the longer the filtration life. The reasons are that the smaller the average particle size is, the more often clogging takes place in the precoat layer at the crud adsorption, and consequently the increase in the filtration differential pressure is accelerated. Thus, to make the filtration life equal or superior to that of the conventional sulfonic acid-based resin, it is desirable that the average particle size of carboxylic acid-based resin is 30 μm or larger. That is, to obtain percent crud removal of 90% or higher and make the filtration life equal or superior to that of the conventional sulfonic acid-based resin, it is desirable that the average particle size of carboxylic acid-based resin is 30 to 60 μm.

The reasons why an average particle size of 50 to 150 μm (60 to 400 meshes) is desirable in the case of the conventional sulfonic acid-based resin, whereas 30 to 60 μm is desirable in the case of carboxylic acid-based resin can be summarized as follows: that is, to obtain a high percent crud removal, the carboxylic acid-based resin must have a larger reactive surface area owing to the weak acidity (whereas the sulfonic acid-based resin is strongly acidic), and thus it is desirable that the average particle size is smaller than that of the conventional sulfonic acid-based resin. Sulfonic acid-based resin is a shrinkable resin in which the resin particles shrink when they absorb cruds, and thus the filtration life is drastically shortened when the average particle size is less than 50 μm, whereas the carboxylic acid-based resin is an expandable resin to the contrary, the filtration life equal to that of the conventional sulfonic acid-based resin can be obtained even if the average particle size is about 30 μm.

Figure 19:
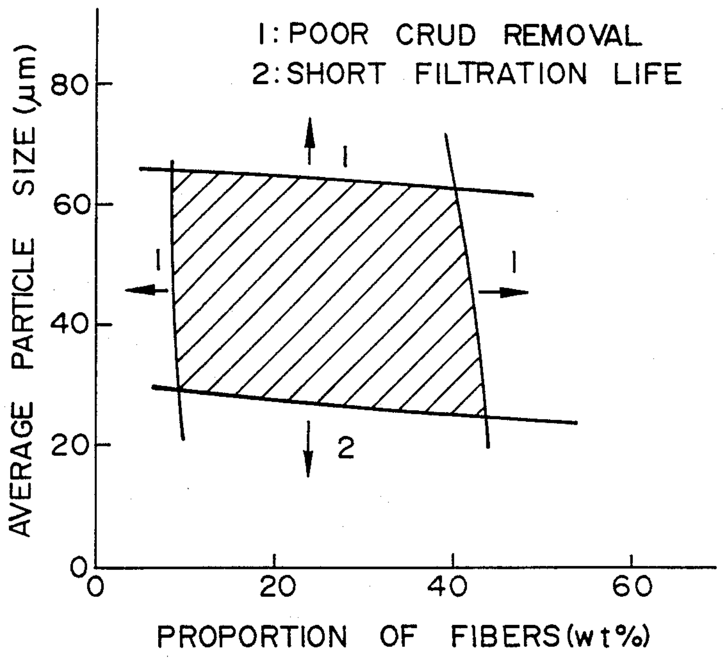
FIG. 19 is a diagram showing relationships between the average particle size and the proportion of fibers.

In FIG. 18, the cases with the proportion of fibers of 20% by weight are shown, but the present inventors have found that a high filtrability can be obtained in proportions of fibers ranging from 10 to 40% by weight shown in FIG. 16 by making the average particle size 30 to 60 μm. This will be explained, referring to FIG. 19. When the proportion of fibers shown on the axis of abscissa is less than 10% by weight, cracks develop, and the percent crud removal becomes less than 90%, whereas above 40% by weight the proportion of ion exchange resin is lowered, and the percent crud removal is lowered. When the average particle size shown on the axis of ordinate is more than 60 μm, the reactive surface area is insufficient, and the percent crud removal is low, whereas below 30 μm clogging takes place in the precoat layer, and the filtration life becomes short. Since the carboxylic acid-based resin is expandable and weakly acidic, and is different in the physical properties from the conventional sulfonic acid-based resin, the optimum conditions for powdery ion exchange resins are quite different therebetween.

Figure 20:
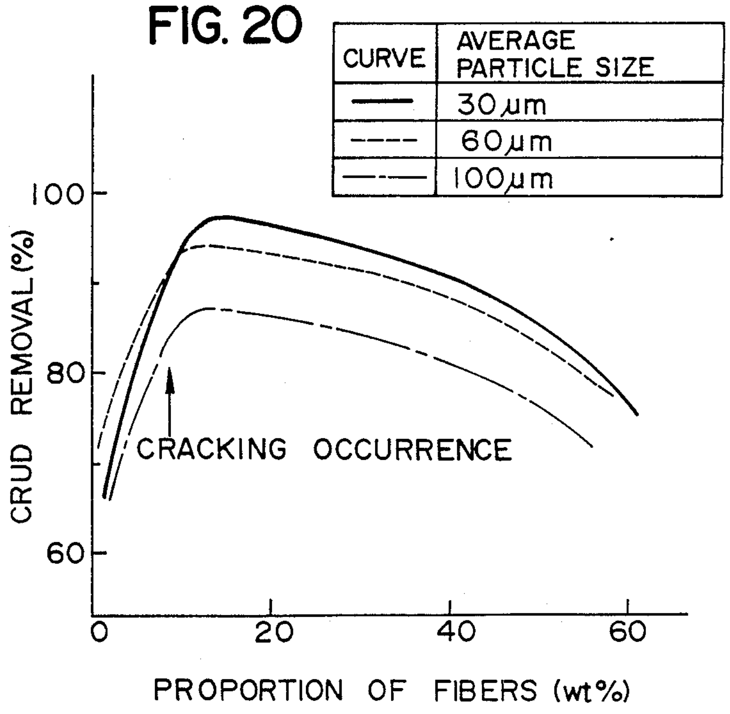
FIG. 20 is a diagram showing relationships between the crud removal and the proportion of fibers.

In the foregoing, carboxylic acid-based resin has been exemplified, but the same results can be obtained from other ion exchange resins, so long as they are the resins according to the present invention. One example is a chelate resin shown as Ⓖ in Table 1. Test results obtained by mixing the cation exchange resin shown as Ⓖ in Table 1 with anion exchange resin in a mixing ratio of the former to the latter of 1:1 by weight, and adding fibers thereto are shown in FIG. 20, where percent crud removal at the time when the filtration differential pressure reaches 1.75 $kg/cm^2$ is shown for chelate cation exchange resins having average particle sizes of 30, 60 and 100 μm when the proportion of plant fibers having a size of about 5 μm and a length of a few tens μm are changed in a range from 0 to 60% by weight. In this case, higher percent crud removal can be obtained in proportions of fibers from 10 to 40% by weight as in FIG. 16, and percent crud removal of 90% or higher can be obtained when the particle size of the cation exchange resin is from 30 to 60 μm, as is obvious from FIG. 20.

When the powdery ion exchange resin is used as a precoat material, the weakly acidic cation exchange resin and anion exchange resin are used in a mixture in a predetermined ratio (usually the ratio of the cation exchange resin to the anion exchange resin is in a range of 4:1 to 1:2), and powdery quaternary, tertiary, secondary and primary amine-based resins, etc. can be used as the anion exchange resin, as in the prior art.

According to the present invention, the following effects can be obtained:

(1) Non-radioactive metals such as $^{59}Co$, etc. are not retained in a nuclear reactor for a long time, and thus formation of $^{60}Co$, etc. is suppressed and deposition of radioactive metals onto pipings can be also suppressed. That is, radiation exposure of operators in an atomic power station can be considerably reduced.

(2) Even if the ions or cruds are trapped from nuclear reactor cooling water, an increase in the filtration differential pressure or crack development can be suppressed, and thus the life of a filtration desalter can be prolonged. That is, not only the cost, but also the amount of discharged wastes can be reduced.

(3) The cation exchange resins for use in the present invention have ion-exchanging groups of low bonding energy, and thus can be thermally decomposed simply. That is, the waste disposal can be readily made, and a considerable reduction in the waste volume can be attained without generation of harmful gas components at the waste disposal and the waste disposal facility can be simplified.

What is claimed is:

1. A process for cleaning nuclear reactor cooling water, which comprises contacting nuclear reactor cooling water with an ion exchange resin mixture of (a) 50 to 90% by weight of a cation exchange carboxylic acid-based resin having an average particle size of 30 to 60 μm, and (b) 10 to 50% by weight of anion exchange resin, said mixture being reinforced with 10 to 40% by weight of reinforcing fibers on a dry basis of total weight of said resins and said fibers, thereby trapping cruds or cations in the cooling water; wherein the cation exchange carboxylic acid-based resin is a straight chain type ion exchange resin whose ion-exchange groups are bonded to other elements than carbon atoms constituting a benzene ring.

2. A process according to claim 1, wherein the cation exchange carboxylic acid-based resin is at least one of acrylic carboxylic acid resin and methacrylic carboxylic acid resin.

3. A process according to claim 1, wherein a bonding energy of ion-exchanging groups of said cation exchange carboxylic acid-based resin is not more than 300 KJ/mole.

4. A process according to claim 1, wherein said ion exchange resin mixture is made up of 60 to 85% by weight of said cation exchange carboxylic acid-based resin and 15 to 40% by weight of said anion exchange resin.

* * * * *